United States Patent
Tseng et al.

(10) Patent No.: US 8,520,566 B2
(45) Date of Patent: Aug. 27, 2013

(54) NETWORK CONNECTION METHOD WITH AUTO-NEGOTIATION MECHANISM, NETWORK APPARATUS HAVING AUTO-NEGOTIATION MECHANISM AND NETWORK CONNECTION METHOD

(75) Inventors: Ta-Chin Tseng, New Taipei (TW); Liang-Wei Huang, Hsinchu (TW); Li-Han Liang, Taipei (TW); Shieh-Hsing Kuo, Hsinchu (TW)

(73) Assignee: Realtek Semiconductor Corp., Hsinchu (TW)

(*) Notice: Subject to any disclaimer, the term of this patent is extended or adjusted under 35 U.S.C. 154(b) by 164 days.

(21) Appl. No.: 13/076,443

(22) Filed: Mar. 31, 2011

(65) Prior Publication Data
US 2011/0249592 A1 Oct. 13, 2011

(30) Foreign Application Priority Data
Apr. 9, 2010 (TW) .................................. 99111063 A

(51) Int. Cl.
*H04L 12/50* (2006.01)
(52) U.S. Cl.
USPC ............................................ 370/294; 370/368
(58) Field of Classification Search
None
See application file for complete search history.

(56) References Cited

U.S. PATENT DOCUMENTS

| | | | | |
|---|---|---|---|---|
| 5,392,276 A | * | 2/1995 | Tran | 370/294 |
| 6,445,701 B1 | * | 9/2002 | Bahl | 370/368 |
| 2005/0288054 A1 | | 12/2005 | Sakaniwa | |

OTHER PUBLICATIONS

LAN/MAN Standards Committee: IEEE Draft P802.3az™/D2.0; "Part 3: Carrier Sense Multiple Access with Collision Detection (CSMA/CD) Access Method and Physical Layer Specifications"; Copyright © 2009 IEEE, pp. 1-251.

* cited by examiner

*Primary Examiner* — Robert Wilson
(74) *Attorney, Agent, or Firm* — McClure, Qualey & Rodack, LLP

(57) ABSTRACT

A network connection method with an auto-negotiation mechanism is applied to a first network apparatus, where the first network apparatus supports a plurality of connection modes, and the method includes: transmitting a plurality of indication signals to a second network apparatus to prepare to establish a link between the first network apparatus and the second network apparatus, where the plurality of indication signals correspond to the plurality of connection modes respectively; counting a number of times that the first network apparatus enters a transmit disable state to generate a counting value; and when the counting value reaches a threshold value, disabling a specific connection mode of the plurality of connection modes supported by the first network apparatus.

17 Claims, 5 Drawing Sheets

NETWORK CONNECTION METHOD WITH AUTO-NEGOTIATION MECHANISM, NETWORK APPARATUS HAVING AUTO-NEGOTIATION MECHANISM AND NETWORK CONNECTION METHOD

BACKGROUND OF THE INVENTION

1. Field of the Invention

The disclosure relates to a network apparatus.

2. Description of the Prior Art

For the improvement of physical layers, a data rate of a network connection has increased from 10 Mb/s to 100 Mb/s and 1000 Mb/s. In order to be downward compatible with previous data rates, IEEE (Institute of Electrical and Electronics Engineers) standard 802.3-2005 supports three data rates (10 Mb/s, 100 Mb/s and 1000 Mb/s). Before two Ethernet physical layers are linked, an auto-negotiation function is performed to confirm a highest data rate supported by these two Ethernet physical layers, and thus the two Ethernet physical layers establish a link at this highest data rate.

IEEE standard 802.3az EEE (Energy Efficiency Ethernet) is recently developed. An Ethernet physical layer supporting this standard needs to confirm the highest data rate of a far-end Ethernet physical layers and to confirm whether the far-end Ether physical layer supports this standard in the process of auto-negotiation. Being downward compatible with a previous version such as IEEE standard 802.3-2000 is what an Ethernet physical layer supporting IEEE standards 802.3-2005 and IEEE 802.3az (EEE) aims for.

SUMMARY OF THE INVENTION

In an exemplary embodiment, a network connection method with an auto-negotiation mechanism is disclosed. The method is applied to a first network apparatus, where the first network apparatus supports a plurality of connection modes, comprising: transmitting a plurality of indication signals to a second network apparatus in preparation of establishing a link between the first network apparatus and the second network apparatus, where the plurality of indication signals correspond to the plurality of connection modes respectively; entering a first link state; counting a number of times that the first network apparatus enters a transmit disable state from the first link state to generate a counting value; and when the counting value reaches a threshold value, disabling a first connection mode of the plurality of connection modes supported by the first network apparatus.

In another exemplary embodiment, a network apparatus having an auto-negotiation mechanism is disclosed. The network apparatus supports a plurality of connection modes, comprising: a first control unit, a counter and a second control unit. The first control unit is utilized for performing an auto-negotiation function between the network apparatus and a far-end network apparatus and entering a first link state. The counter is coupled to the first control unit, and is utilized for counting a number of times that the first control unit enters a transmit disable state from the first link state during a period of the auto-negotiation to generate a counting value. The second control unit is coupled to the counter, and is utilized for disabling a first connection mode of the plurality of connection modes of the network apparatus when the counting value reaches a threshold value.

In another exemplary embodiment, a network connection method is disclosed. The network connection method is applied to a first network apparatus, where the first network apparatus supports a plurality of connection modes, the method comprising: performing auto-negotiation in preparation of establishing a link to a second network apparatus in a first connection mode of the plurality of connection modes; during a period of time that the first network apparatus performs auto-negotiation with the second network apparatus, if the first network apparatus fails to establish the link to the second network apparatus in the first connection mode, determining whether the period of time is greater than a threshold value; and if the period of time reaches the threshold value, disabling the first connection mode supported by the first network apparatus.

DETAILED DESCRIPTION

Figure 1:
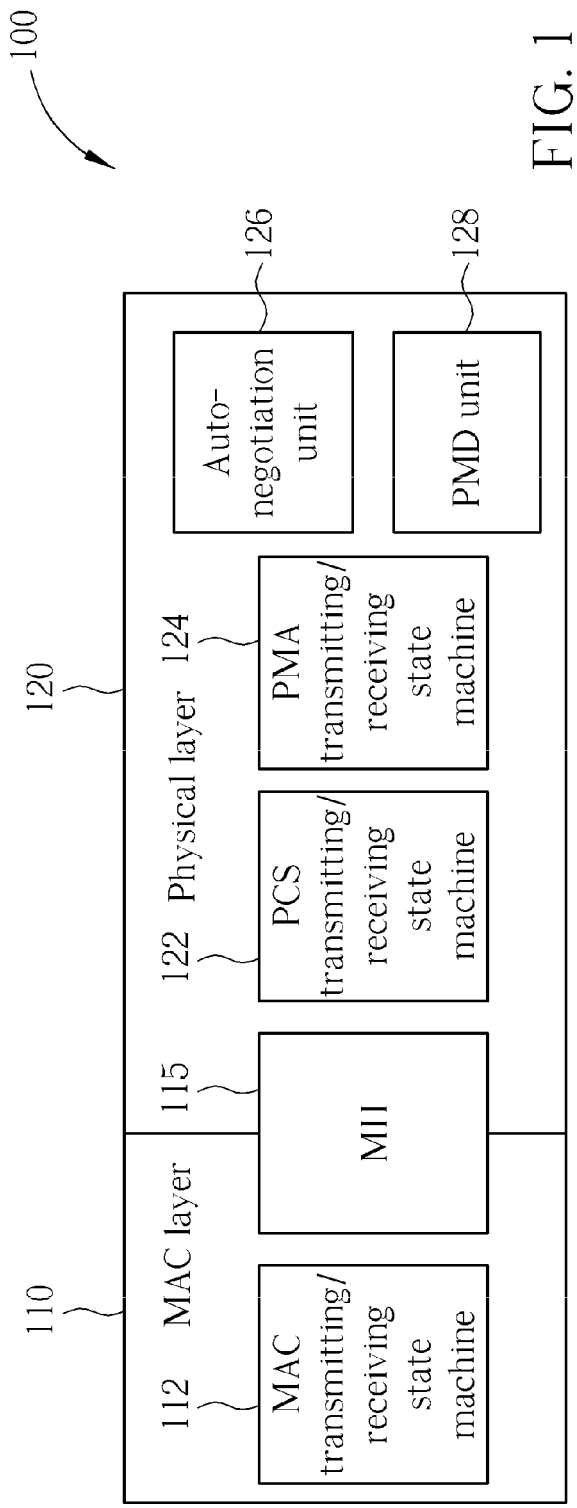
FIG. 1 is a diagram illustrating an exemplary embodiment of a network apparatus.

Please refer to FIG. 1. FIG. 1 is a diagram illustrating an exemplary embodiment of a network apparatus 100. As shown in FIG. 1, the network apparatus 100 comprises a media access control (MAC) layer 110 and a physical layer 120, where the MAC layer 110 comprises a MAC transmitting/receiving state machine 112, the physical layer 120 comprises a physical coding sub-layer (PCS) transmitting/receiving state machine 122, a physical media attachment (PMA) transmitting/receiving state machine 124, an auto-negotiation unit 126 and a physical media dependent (PMD) unit 128. The MAC layer 110 is connected to the physical layer 120 via a media independent interface (MII) 155. In addition, because functions and operations of the MAC transmitting/receiving state machine 112, the PCS transmitting/receiving state machine 122, PMA transmitting/receiving state machine 124, the PMD unit 128 and the MII 115 are described in the related standards such as IEEE standard 802.3-2005, further descriptions are omitted here.

In this exemplary embodiment, the network apparatus 100 complies with the IEEE standard 802.3, and supports a plurality of connection modes including an Energy Efficiency Ethernet (EEE) mode.

Figure 2:
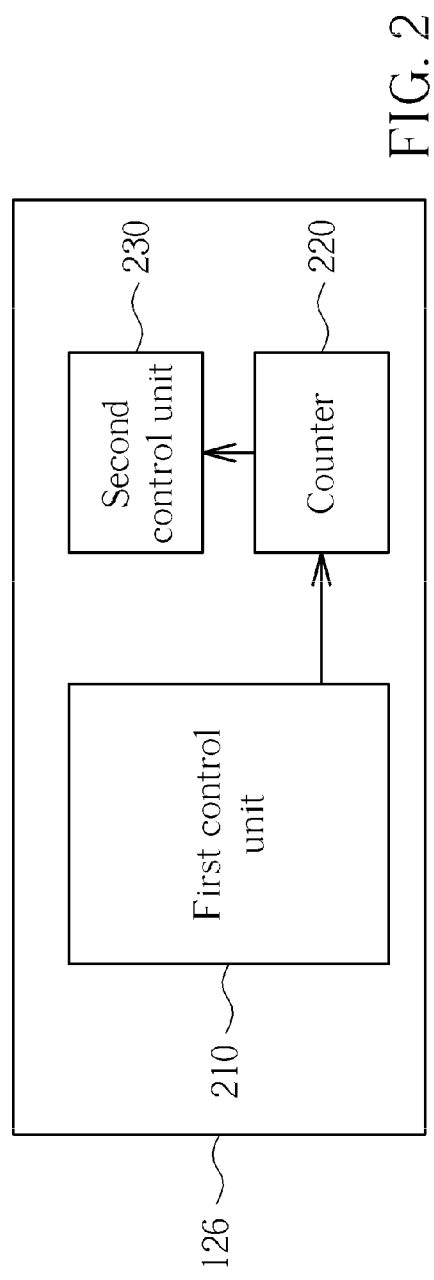
FIG. 2 is a diagram illustrating an exemplary embodiment of the auto-negotiation unit shown in FIG. 1.
Figure 3:
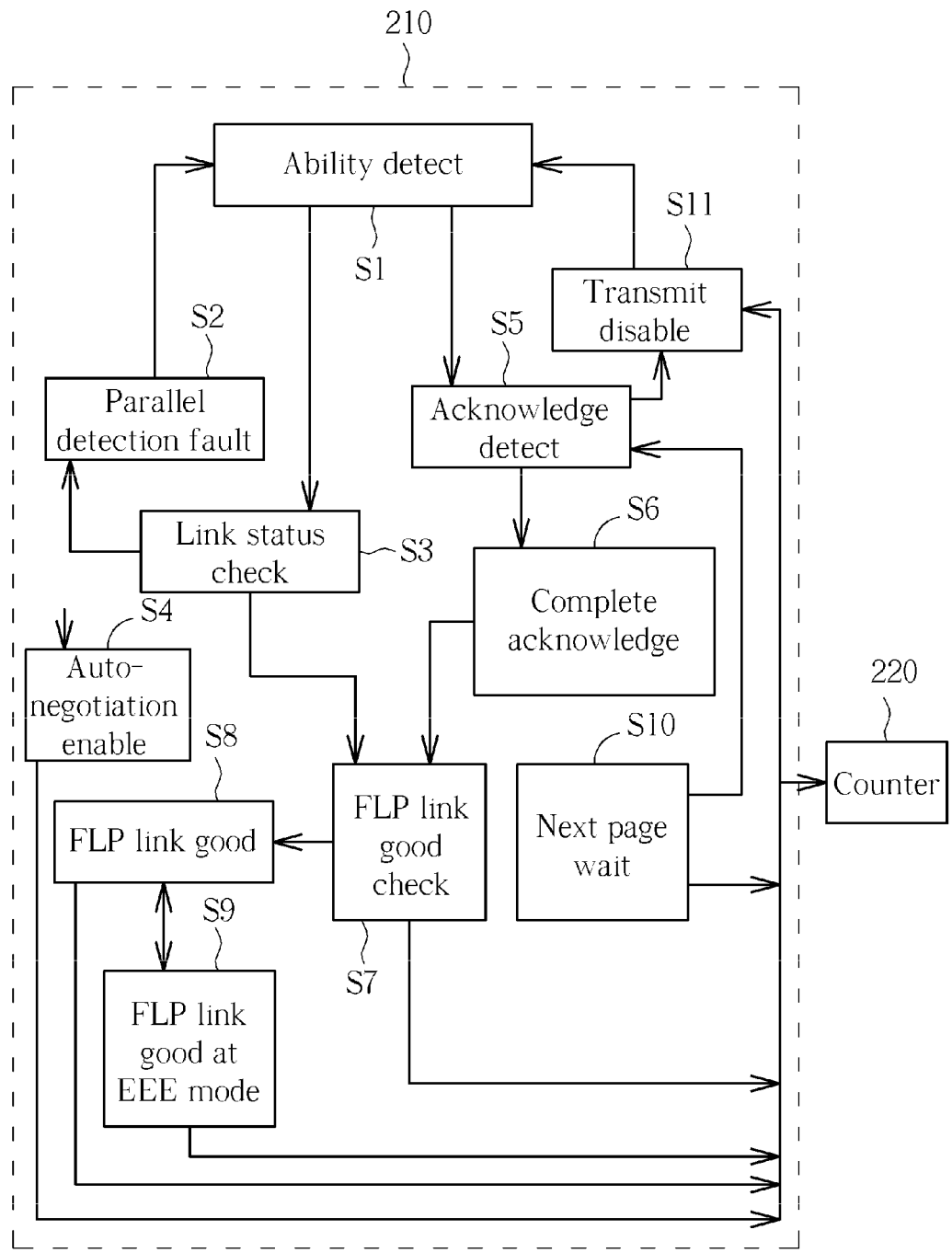
FIG. 3 is a diagram of using a state machine to implement the first control unit shown in FIG. 2.

Please refer to FIG. 2. FIG. 2 is a diagram illustrating an exemplary embodiment of the auto-negotiation unit 126. As shown in FIG. 2, the auto-negotiation unit 126 comprises a first control unit 210, a counter 220 and a second control unit 230. FIG. 3 is a diagram using a state machine to show the first control unit 210. As shown in FIG. 3, the first control unit 210 comprises the following states: ability detect S1, parallel detection fault S2, link status check S3, auto-negotiation enable S4, acknowledge detect S5, complete acknowledge S6, fast link pulse (FLP) link good check S7, FLP link good S8, FLP link good at EEE mode S9, next page wait S10 and transmit disable S11. In addition, transition conditions and operations of the states S1-S11 are described in the IEEE standard 802.3-2005, and are known for a person skilled in this art. Therefore, detailed descriptions of some states are omitted in the following descriptions.

Figure 4:
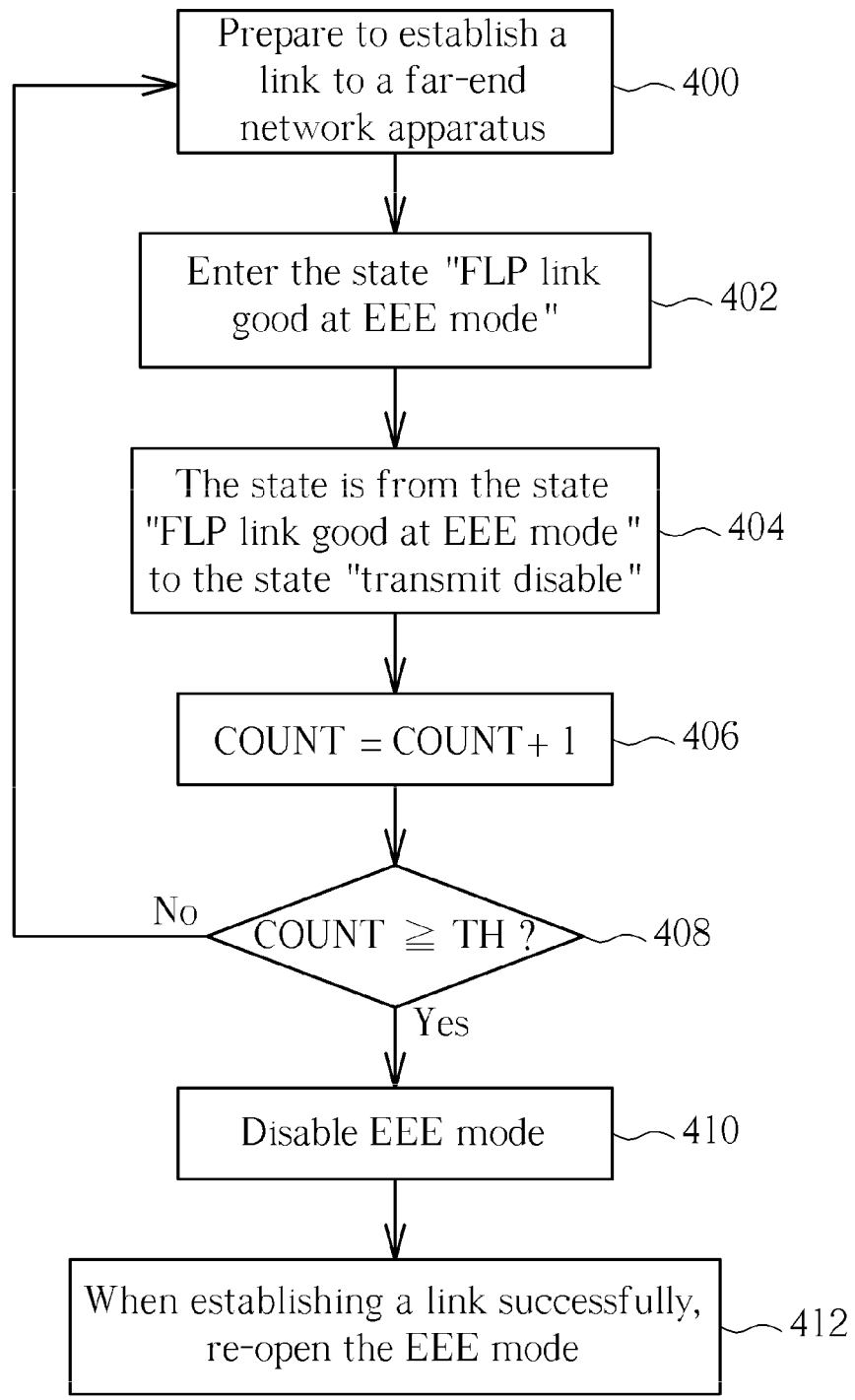
FIG. 4 is a flowchart of an exemplary embodiment of an auto-negotiation method of a network connection.

Please refer to FIGS. 2~4 together. FIG. 4 is a flowchart of an exemplary embodiment of an auto-negotiation method of a network connection. In the flowchart shown in FIG. 4, it is assumed that the auto-negotiation unit 126 complies with the IEEE standard 802.3-2005, and the network apparatus 100 starts to establish a link to another network apparatus supporting EEE mode. Referring to FIG. 4, the flow is described as follows:

In Step 400, the network apparatus 100 starts to establish a link to a far-end network apparatus, where in this embodiment, both the network apparatus 100 and the far-end network apparatus support four connection modes: 10 Mb/s, 100 Mb/s, 1000 Mb/s and EEE 100 Mb/s/1000 Mb/s. In one embodiment, the network apparatus 100 transmits a plurality of indication signals to the far-end network apparatus to exchange connection information, where the indication signals include information about connection abilities. In one embodiment, the indication signals are transmitted in three successive pages:

First page: 10 Mb/s/100 Mb/s connection ability.
Second page: 1000 Mb/s connection ability.
Third page: EEE 100 Mb/s/1000 Mb/s connection ability.

Then, in Step 402, after the network apparatus 100 transmits these indication signals to the far-end network apparatus, the first control unit 210 enters the state "FLP link good at EEE mode" S9, as shown in FIG. 3. At this time, if the far-end network apparatus cannot establish a link because of failing to identify the EEE mode due to the external environment, hardware or compatibility issue, the flow shown in FIG. 4 enters Step 404, and the state of the first control unit 210 will be from the state "FLP link good at EEE mode" S9 to the state "transmit disable" S11.

In Step 406, the counter 220 counts a number of times that the first control unit 210 enters the state "transmit disable" S11 from the state "FLP link good at EEE mode" S9 to generate a counting value COUNT (in the flow shown in FIG. 4, an initial value of the counting value COUNT is assumed to be "0"). Then, in Step 408, the second control unit 230 determines whether the counting value COUNT reaches a threshold value TH. If the counting value COUNT does not reach the threshold value TH, the flow goes back to Step 400 to re-establish a link (re-link) to the far-end network apparatus; if the counting value COUNT reaches the threshold value TH, the flow enters Step 410.

In Step 410, several embodiments are provided to solve the problem that the far-end network apparatus cannot identify the EEE mode. In one embodiment of Step 410, the second control unit 230 disables the EEE mode of the network apparatus 100. Therefore, during the next time the network apparatus 100 prepares to re-establish a link (re-link) to the far-end network apparatus, the network apparatus 100 only transmits the above-mentioned first and second pages and does not transmit the third page to the far-end network apparatus; that is, the network apparatus 100 will not use the EEE mode to establish a link to the far-end network apparatus. In addition, in another embodiment of Step 410, contents of the third page are modified to show that the network apparatus 100 does not support the EEE mode, and therefore the far-end network apparatus can identify the modified third page. Then, during the next time the network apparatus 100 prepares to re-establish a link (re-link) to the far-end network apparatus, the network apparatus 100 transmits the above-mentioned first and second pages, and the modified third page to the far-end network apparatus. Finally, in Step 412, when the network apparatus 100 establishes a link to the far-end network apparatus successfully (that is, establishes a link at data rates 10 Mb/s, 100 Mb/s or 1000 Mb/s), the second control unit 230 re-opens the EEE mode of the network apparatus 100 so the network apparatus 100 is able to use the EEE mode to establish a link to the far-end network apparatus next time.

Briefly summarizing the flow shown in FIG. 4, in one embodiment, it is determined whether the link at EEE mode between two network apparatuses is stable or not according to a number of times that the first control unit 210 enters the state "transmit disable" S11 from the state "FLP link good at EEE mode" S9, and it is further determined whether to disable the EEE mode in order to prevent two Ethernet physical layers from being in an infinite loop of auto-negotiation and re-establish the link (re-link).

Figure 5:
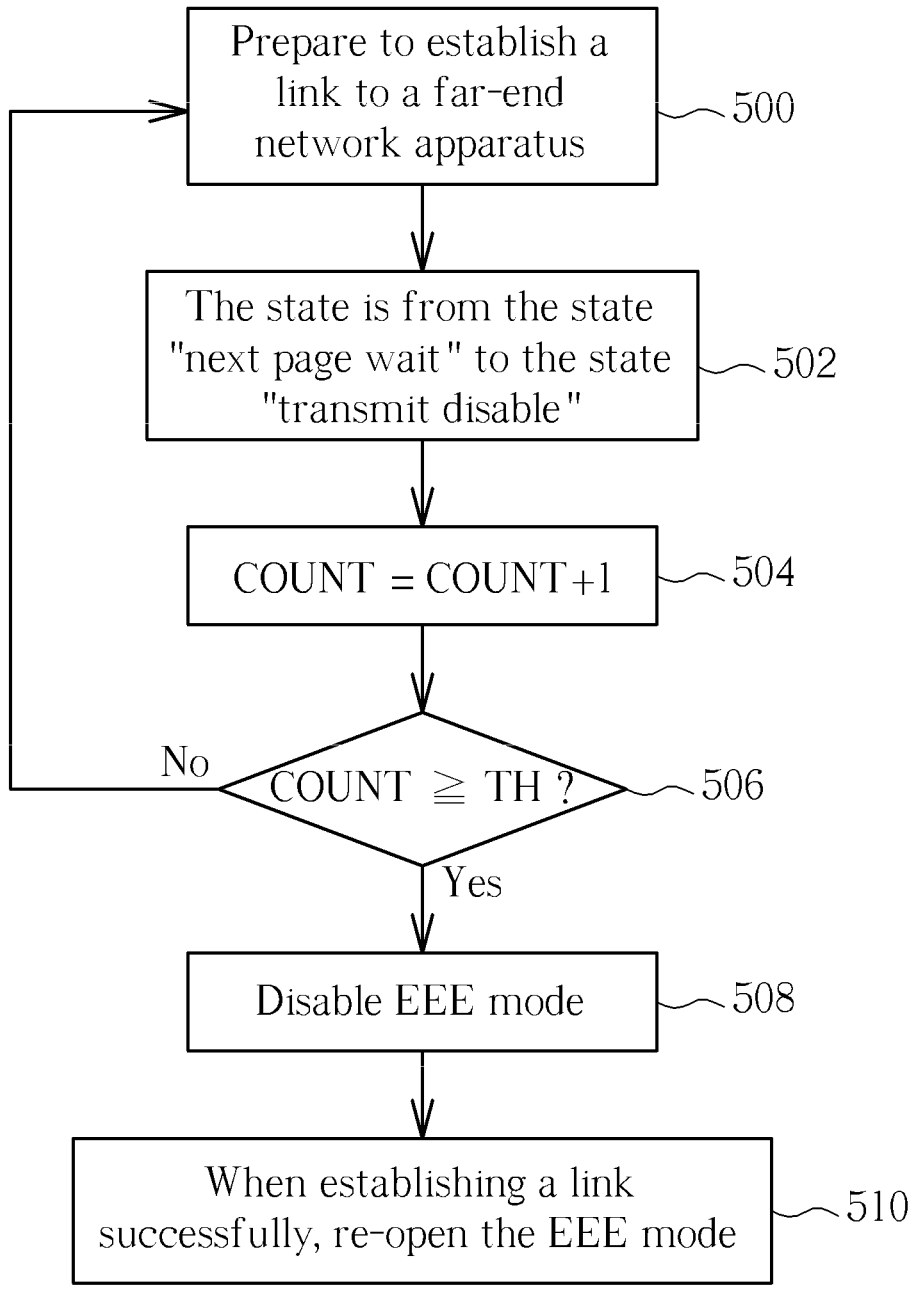
FIG. 5 is a flowchart of an exemplary embodiment of an auto-negotiation method of a network connection.

Please refer to FIGS. 2, 3 and 5 together. FIG. 5 is a flowchart of an exemplary embodiment of an auto-negotiation method of a network connection. In the flowchart shown in FIG. 5, it is assumed that the auto-negotiation unit 126 complies with the IEEE standard 802.3-2005, and the network apparatus 100 is prepared to establish a link to a far-end network apparatus not supporting EEE mode (e.g., the far-end network apparatus complies with the IEEE standard 802.3-2000). Referring to FIG. 5, the flow is described as follows:

In Step 500, the network apparatus 100 is prepared to establish a link to a far-end network apparatus, where in this embodiment, the network apparatus 100 supports four connection modes: 10 Mb/s, 100 Mb/s, 1000 Mb/s and EEE 100 Mb/s/1000 Mb/s while the far-end network apparatus only supports three connection modes 10 Mb/s, 100 Mb/s and 1000 Mb/s. In the prior art, however, after the far-end network apparatus receives the first and second pages (i.e., 10 Mb/s/ 100 Mb/s and 1000 Mb/s connection abilities), the far-end network apparatus will erroneously decide that the network apparatus 100 has transmitted all the pages related to the connection modes. Therefore, the far-end network apparatus will enter the state "FLP link good" and does not send any response related to the connection modes to the network apparatus 100. At this time, the first control unit 210 of the network apparatus 100 is still at the state "next page wait" S10 shown in FIG. 3, and after a certain period of time, in a situation of not receiving the related response from the far-end network apparatus, the first control unit 210 of the network apparatus 100 will enter the state "transmit disable" S11 from the state "next page wait" S10 (Step 502).

In Step 504, the counter 220 counts a number of times that the first control unit 210 enters the state "transmit disable" S11 from the state "next page wait" S10 to generate a counting value COUNT (in the flow shown in FIG. 5, an initial value of the counting value COUNT is assumed to be "0"). Then, in Step 506, the second control unit 230 determines whether the counting value COUNT reaches a threshold value TH. If the counting value COUNT does not reach the threshold value TH, the flow goes back to Step 500 to re-establish a link (re-link) to the far-end network apparatus; if the counting value COUNT reaches the threshold value TH, the flow enters Step 508.

In Step 508, the second control unit 230 disables the EEE mode of the network apparatus 100. Therefore, during the next time the network apparatus 100 prepares to re-establish a link (re-link) to the far-end network apparatus, the network apparatus 100 only transmits the above-mentioned first and second pages and does not transmit the third page to the far-end network apparatus. After the network apparatus 100 receives the two pages of response related to the connection modes 10 Mb/s/100 Mb/s and 1000 Mb/s from the far-end network apparatus, the first control unit 210 will directly enter the state "FLP link good" S8 and does not enter the state "next page wait" S10 to wait for the response from the far-end network apparatus. Finally, in Step 510, when the network apparatus 100 establishes a link to the far-end network apparatus successfully (that is, establishes a link at data rates 10 Mb/s, 100 Mb/s or 1000 Mb/s), the second control unit 230 re-opens the EEE mode of the network apparatus 100 so the network apparatus 100 is able to use the EEE mode to establish a link to a far-end network apparatus next time.

Briefly summarizing the flow shown in FIG. 5, in one embodiment, it is determined whether the far-end network apparatus supports the EEE mode or not according to a number of times that the first control unit 210 enters the state "transmit disable" S11 from the state "next page wait" S10, and it is further determined whether to disable the EEE mode to prevent two Ethernet physical layers from being in an infinite loop of performing auto-negotiation and re-establish the link continuously.

In addition, the auto-negotiation unit 126 is for illustrative purposes only: in another embodiment, the first control unit 210 and the second control unit 230 can be integrated as a signal control unit.

In addition, the embodiment shown in FIG. 4 assumes that the network apparatus 100 complies with the IEEE standard 802.3-2005, and both the network apparatus 100 and the far-end network apparatus support the EEE mode; however, this is not meant to be a limitation of the present invention. In another exemplary embodiment, as long as both the network apparatus 100 and the far-end network apparatus support a specific connection mode, whether the link at the specific connection mode between two network apparatuses is stable or not can be determined. Furthermore, whether to disable the specific connection mode to prevent the link between the two network apparatuses from failure can also be determined.

Similarly, the embodiment shown in FIG. 5 assumes that the network apparatus 100 complies with the IEEE standard 802.3-2005, and the far-end network apparatus does not support the EEE mode; however, this is not meant to be a limitation of the present invention. In another exemplary embodiment, as long as the network apparatus supports a specific connection mode while the far-end network apparatus does not support the specific connection mode, the network apparatus 100 can determine whether the far-end network apparatus supports the specific connection mode, and further determine whether to disable the specific connection mode or not to prevent the link between the two network apparatuses from failure.

Figure 6:
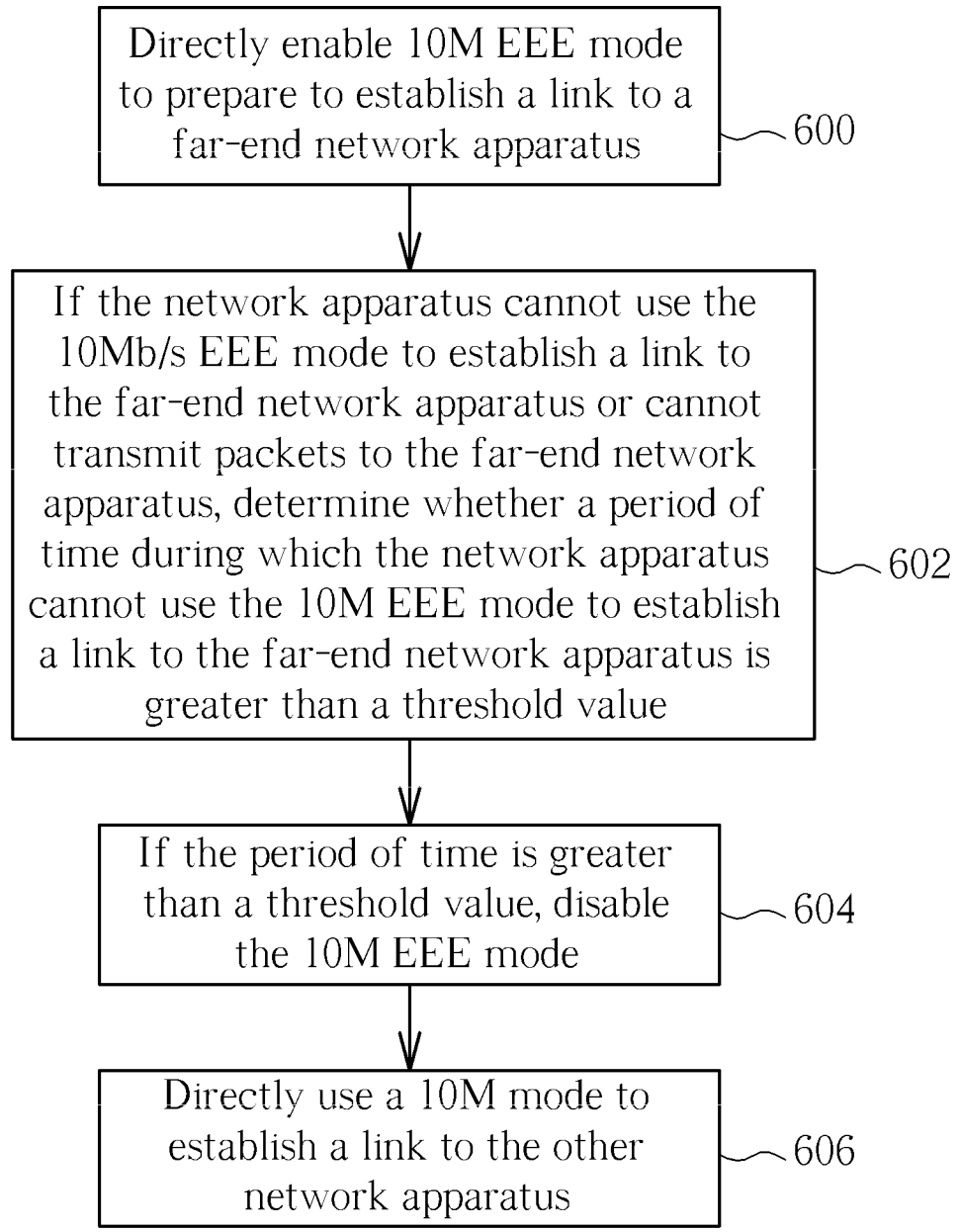
FIG. 6 is a flowchart of an exemplary embodiment of a network connection method.

In addition, if the network apparatus 100 supports the 10 Mb/s EEE mode, the network apparatus 100 directly enables the 10 Mb/s EEE mode without auto-negotiating with a far-end network apparatus. However, if the far-end network apparatus does not support the 10 Mb/s EEE mode, the network apparatus 100 may not receive response packets from the far-end network apparatus due to the compatibility issue, or may not establish a link at the 10 Mb/s EEE mode. To solve this problem, please refer to FIGS. 1 and 6. FIG. 6 is a flowchart of an exemplary embodiment of a network connection method. Referring to FIG. 6, the flow is described as follows:

In Step 600, the network apparatus 100 directly enables the 10 Mb/s EEE mode to prepare to establish a link to a far-end network apparatus. Then, in Step 602, if the network apparatus cannot use the 10 Mb/s EEE mode to establish a link to the far-end network apparatus or cannot transmit packets to the far-end network apparatus, it is determined whether a period of time during which the network apparatus 100 cannot use the 10 Mb/s EEE mode to establish a link to the far-end network apparatus is greater than a threshold value. If the period of time is greater than the threshold value, the flow enters Step 604 to disable the 10 Mb/s EEE mode of the network apparatus 100. Then, in Step 606, the network apparatus 100 directly uses a 10 Mb/s mode to establish a link to the far-end network apparatus.

Summarily, in the network connection method, auto-negotiation method of the network connection and related network apparatus, it is determined whether to disable the EEE mode of the network apparatus to prevent the connection from failure in light of a determination of whether the link at EEE mode between two network apparatuses is stable, or according to a determination of whether the far-end network apparatuses supports the EEE mode.

Those skilled in the art will readily observe that numerous modifications and alterations of the device and method may be made while retaining the teachings of the invention.

What is claimed is:

1. A network connection method with an auto-negotiation mechanism, applied to a first network apparatus, wherein the first network apparatus supports a plurality of connection modes, the method comprising:
transmitting a plurality of indication signals to a second network apparatus in preparation of establishing a link between the first network apparatus and the second network apparatus, wherein the plurality of indication signals correspond to the plurality of connection modes respectively;
entering a first link state;
counting a number of times that the first network apparatus enters a transmit disable state from the first link state to generate a counting value; and
when the counting value reaches a threshold value, disabling a first connection mode of the plurality of connection modes supported by the first network apparatus.

2. The method of claim 1, wherein the step of counting the number of times that the first network apparatus enters the transmit disable state to generate the counting value comprises:
counting the number of times that the first network apparatus enters the transmit disable state from a link good state.

3. The method of claim 1, wherein the step of counting the number of times that the first network apparatus enters the transmit disable state to generate the counting value comprises:
counting the number of times that the first network apparatus enters the transmit disable state from a next page wait state.

4. The method of claim 1, further comprising:
after disabling the first connection mode, if the first network apparatus establishes the link to the second network apparatus, enabling the first connection mode.

5. The method of claim 1, wherein the method complies with IEEE standard 802.3, and the first connection mode is an Energy Efficient Ethernet (EEE) mode.

6. The method of claim 1, wherein the step of disabling the first connection mode comprises:
not transmitting a first indication signal of the plurality of indication signals to the second network apparatus, where the first indication signal corresponds to the first connection mode.

7. The method of claim 1, wherein the step of disabling the first connection mode comprises:
modifying a content of the first indication signal of the plurality of indication signals to show that the first network apparatus does not support the first connection mode, wherein the first indication signal corresponds to the first connection mode.

8. A network apparatus having an auto-negotiation mechanism, wherein the network apparatus supports a plurality of connection modes, the network apparatus comprising:
- a first control unit, for performing the auto-negotiation mechanism with a far-end network apparatus and entering a first link state;
- a counter, coupled to the first control unit, for counting a number of times that the first control unit enters a transmit disable state from the first link state during a period of performing the auto-negotiation mechanism to generate a counting value; and
- a second control unit, coupled to the counter, for disabling a first connection mode of the plurality of connection modes of the network apparatus when the counting value reaches a threshold value.

9. The network apparatus of claim 8, wherein the counter counts the number of times that the first control unit enters the transmit disable state from a link good state.

10. The network apparatus of claim 8, wherein the counter counts the number of times that the first control unit enters the transmit disable state from a next page wait state.

11. The network apparatus of claim 8, wherein after disabling the first connection mode, if the first control unit establishes the link to the far-end network apparatus, the second control unit enables the first connection mode.

12. The network apparatus of claim 8, wherein the network apparatus complies with an IEEE standard 802.3, and the first connection mode is an Energy Efficient Ethernet (EEE) mode.

13. The network apparatus of claim 8, wherein the first control unit transmits a plurality of indication signals to the far-end network apparatus to start to establish the link, the plurality of indication signals corresponding to the plurality of connection modes respectively.

14. The network apparatus of claim 13, wherein when the second control unit disables the first connection mode, the first control unit does not transmit a first indication signal of the plurality of indication signals to the far-end network apparatus, the first indication signal corresponding to the first connection mode.

15. The network apparatus of claim 13, wherein when the second control unit disables the first connection mode, the first control unit modifies a content of the first indication signal of the plurality of indication signals to show that the first control unit does not support the first connection mode, the first indication signal corresponding to the first connection mode.

16. A network connection method, applied to a first network apparatus, wherein the first network apparatus supports a plurality of connection modes, the method comprising:
- performing auto-negotiation in preparation of establishing a link to a second network apparatus in a first connection mode of the plurality of connection modes;
- during a period of time that the first network apparatus performs auto-negotiation with the second network apparatus, if the first network apparatus fails to establish the link to the second network apparatus in the first connection mode, determining whether the period of time is greater than a threshold value; and
- when the period of time reaches the threshold value, disabling the first connection mode supported by the first network apparatus.

17. The method of claim 16, further comprising:
- in response to disabling the first connection mode, enabling a second connection mode of the plurality of connection modes, wherein the second connection mode differs from the first connection mode.

* * * * *